(12) United States Patent
Lustenberger (10) Patent No.: US 9,944,492 B2
(45) Date of Patent: Apr. 17, 2018

(54) METHOD OF RESETTING A SAFETY SYSTEM OF AN ELEVATOR INSTALLATION

(71) Applicant: Inventio AG, Hergiswil (CH)

(72) Inventor: Ivo Lustenberger, Buttisholz (CH)

(73) Assignee: INVENTIO AG, Hergiswil (CH)

(*) Notice: Subject to any disclaimer, the term of this patent is extended or adjusted under 35 U.S.C. 154(b) by 410 days.

(21) Appl. No.: 14/430,958

(22) PCT Filed: Sep. 19, 2013

(86) PCT No.: PCT/EP2013/069450
§ 371 (c)(1),
(2) Date: Mar. 25, 2015

(87) PCT Pub. No.: WO2014/048826
PCT Pub. Date: Apr. 3, 2014

(65) Prior Publication Data
US 2015/0251875 A1    Sep. 10, 2015

(30) Foreign Application Priority Data
Sep. 25, 2012  (EP) .................................. 12185777

(51) Int. Cl.
*B66B 1/28* (2006.01)
*G05B 15/00* (2006.01)
(Continued)

(52) U.S. Cl.
CPC .......... *B66B 1/3461* (2013.01); *B66B 5/0031* (2013.01); *G05B 9/02* (2013.01); *B66B 5/0087* (2013.01)

(58) Field of Classification Search
CPC ... B66B 1/3461; B66B 5/0031; B66B 5/0087; G05B 9/02
(Continued)

(56) References Cited

U.S. PATENT DOCUMENTS 4,246,983 A * 1/1981 Bril ........................... B66B 1/16
187/247
5,274,203 A * 12/1993 Skalski ................. B66B 1/3492
187/287
(Continued)

FOREIGN PATENT DOCUMENTS

EP          2336070 A1    6/2011
JP       2002160872 A    6/2002
(Continued)

OTHER PUBLICATIONS

JP-2004099301 machine language translation, cited by Applicant, dated Apr. 2, 2004.*

*Primary Examiner* — Jeffrey Donels
(74) *Attorney, Agent, or Firm* — William J. Clemens; Shumaker, Loop & Kendric, LLP (57) ABSTRACT

A method for resetting a safety system of an elevator installation from an actual state, in which a normal operation of the elevator installation is not released, to a desired state, in which a normal operation of the elevator installation is released by the safety system includes the steps of: receiving a reset request, which is transmitted from the elevator control system, for resetting from the actual state to the desired state, in the safety system; carrying out verification of the reset request by the safety system; evaluating the verification by the safety system; and resetting the safety system from the actual state to the desired state if the verification by the safety system is evaluated as valid.

12 Claims, 3 Drawing Sheets

(51) Int. Cl.
*B66B 1/34* (2006.01)
*B66B 5/00* (2006.01)
*G05B 9/02* (2006.01)

(58) Field of Classification Search
USPC .......................................................... 187/247
See application file for complete search history.

(56) References Cited

U.S. PATENT DOCUMENTS

| | | | |
|---|---|---|---|
| 5,445,245 A * | 8/1995 | Ketoviita | B66B 5/0025 187/247 |
| 9,403,663 B2 * | 8/2016 | Dellarippa | B66B 1/34 |
| 2004/0094366 A1 | 5/2004 | Weinberger et al. | |
| 2009/0133969 A1 | 5/2009 | Zaharia et al. | |
| 2009/0218178 A1 | 9/2009 | Lence-Barreiro | |
| 2012/0018256 A1 * | 1/2012 | Mangini | B66B 5/005 187/247 |
| 2014/0262629 A1 * | 9/2014 | Toutaoui | B66B 1/3461 187/393 |
| 2015/0088286 A1 * | 3/2015 | Ruth | G05B 19/0426 700/86 |

FOREIGN PATENT DOCUMENTS

| | | | |
|---|---|---|---|
| JP | 2004099301 A | 4/2004 | |
| JP | 2011256006 A | 12/2011 | |
| WO | 03024856 A1 | 3/2003 | |

* cited by examiner

METHOD OF RESETTING A SAFETY SYSTEM OF AN ELEVATOR INSTALLATION

FIELD

The invention relates to a method of resetting a safety system of an elevator installation from an actual state to a desired state, particularly to a normal state, in which a normal operation of the elevator installation is released by the safety system, and to an elevator installation for performing the method.

BACKGROUND

Elevator installations comprise a safety system for ensuring sufficient operational safety. The requirements are fixed by various standards and regulations. These safety systems are usually constructed to be largely independent and superordinate to the rest of the elevator systems. The safety system can influence the elevator installation and is for that purpose connected with, for example, the drive or brake unit of the elevator installation. If sufficient operational safety is not guaranteed, travel operation is interrupted.

A safety system of that kind can be constructed as a safety circuit in which a plurality of safety elements such as, for example, safety contacts and safety switches are arranged in series connection. The contacts monitor, for example, whether a shaft door or the car door is open. The elevator car can be moved only when the safety circuit and thus also all safety contacts integrated therein are closed. Some of the safety elements are actuated by the doors. Other safety elements such as, for example, an over-travel switch are actuated or triggered by the elevator car. The safety circuit interrupts travel operation if the safety circuit is opened.

Safety systems with safety circuits of this kind are subject to numerous disadvantages such as, for example, inherent problems of a voltage drop in the safety circuit and a comparatively high susceptibility to fault. In addition, the safety circuit does not allow a specific diagnosis, since if the safety circuit is open it can be established only that at least one safety contact is open.

It was therefore proposed to equip elevator installations with a safety bus system instead of the mentioned safety circuit. The safety bus system typically comprises a control unit, a safety bus and one or more bus junctions. Various safety elements such as, for example, door contacts, lock contacts or buffer contacts are interrogated by way of the bus junctions. If a report of the safety elements does not correspond with a target magnitude, the safety system can influence the control of the elevator installation and, for example, initiate emergency switching-off. The safety system can in that case pass into an emergency state in which operation of the elevator installation is, for example, blocked or is possible only to reduced extent. Typical emergency states comprise, for example, emergency switching-off, for example as a consequence of the elevator car exceeding a speed or an unclosed door or a maintenance state in which only maintenance journeys are possible. A safety system of that kind is described in, for example, WO 03/024856 A.

If the safety system passes into an emergency state, it is necessary to reset the safety system to a normal state in which normal operation of the elevator installation is released. The safety system is often set back ('reset') to the normal state by a service engineer after successful checking of the elevator installation. Resetting can in that case be carried out, for example, directly at an access point of the safety system. This can be arranged in, for example, a closed maintenance area so as to ensure that only an authorized person can trigger the resetting. However, the safety system is thus often difficult to access, whereby resetting can be time-consuming and, for example, inconvenient for the service engineer. Resetting could in certain cases also be carried out automatically by an elevator control. However, in this case the requisite safety steps for resetting would often not be guaranteed, since an elevator control as an unsafe system is subordinate to the safety system in a safety hierarchy.

SUMMARY

It is therefore an object of the invention to provide a method and an elevator installation with a safety system, which enable efficient and safe operation of the elevator installation. Moreover, it is an object of the invention to provide a method and an elevator installation with a safety system which will enable convenient and simple resetting of the safety system with sufficient safety against, for example, misuse, vandalism, faulty operation or faulty functions.

These objects are fulfilled by a method of resetting a safety system of an elevator installation from an actual state, particularly a state in which a normal operation of the elevator installation is not released, to a desired state, particularly to a normal state in which a normal operation of the elevator installation is released by the safety system, wherein the safety system is connected by way of at least one communications interface for data exchange with a control system, which is associated with the elevator installation, but which, in particular, does not belong to the safety system. The method comprises the steps of:
  receiving a reset request, which is transmitted from the control system, for resetting from the actual state to the desired state in the safety system;
  carrying out verification of the reset request by the safety system;
  evaluating the verification by the safety system; and
  resetting the safety system from the actual state to the desired state if the verification by the safety system is evaluated as valid.

It is ensured by means of this method that resetting of the safety system represents an action of intentional processing and takes place securely. In particular, resetting of the safety system by unauthorized personnel or by a faulty function, for example in the case of a randomly generated reset request, can be excluded. Accordingly, the method ensures that when normal operation of the elevator installation is taken up the safety system is reliably placed in operation.

By "actual state" there is denoted an instantaneous state of the safety system from which it is to be reset to the desired state by the transmitted reset request. The actual state is typically an emergency state in which normal operation of the elevator installation is not released. The actual state can be, for example, a state in which the safety system is disposed as a consequence of, for example, a faulty function or at the time of maintenance of the elevator installation.

The "desired state" denotes a state to which the safety system is to be transferred as the consequence of the reset request. In particular, the desired state is a normal state in which normal operation of the elevator installation is made possible. In this case, verification of the reset request is particularly important in order to guarantee safety during normal operation. It will be obvious that depending on requirements the actual state can also be a normal state and the desired state an emergency state. In particular, the desired state can also be, for example, a maintenance state in which only maintenance journeys are possible.

The control system can comprise not only internal components belonging to the elevator installation, but also external components. Internal components can be, for example, locally fixed or mobile control units of the elevator installation. In particular, the control system can comprise, for example, parts of an elevator control of the elevator installation. Mobile control units such as, for example, portable maintenance or diagnostic apparatus or mobile telephones can be connected or connectible by way of, for example, an internal cable-supported or cable-free network. Depending on respective requirements the control units can comprise, for example, means for reading out or representing data, such as, for example, a display, and/or means for input of data, such as, for example, a keypad or a touchscreen.

External components of the control system can be connected by way of, for example, an external, possibly public, network. For example, a mobile telephone, which is connected by a mobile radio network with the control system, or a computer, which is connected by way of the Internet, can form part of the control system. The control system can for that purpose comprise an interface unit for connection with the corresponding external network.

The at least one communications interface can comprise, for example, a communications bus led by way of a cable (for example, CAN, i.e. 'Controller Area Network', bus). However, the communications interface can equally also comprise an internal cable-free network belonging to the elevator installation (for example WLAN, i.e. 'Wireless Local Area Network', network) or a connection to an external public cable-free or cable-supported network. It will be obvious that the control system or components thereof can be connected with the safety system by way of one or several communications interfaces.

The "reset request" denotes a reset request for resetting from the actual state to the desired state. The transmission of the reset request to the safety system can be triggered by a user or by a system of the elevator installation (denoted in the following in general by "trigger"). In the case of transmission of the reset request it is optionally possible to transmit additional data to the safety system such as, for example, the intended desired state or optionally data of the trigger. The reset request can be transmitted to the safety system by way of an internal or external component of the control system.

Denoted by "verification" is, fundamentally, any form of confirmation of the validity of the reset request. The verification can in that case advantageously also comprise an authentication, wherein in addition an authorization or identity of, for example, the trigger is checked. According to the invention, resetting of the safety system to the desired state as a rule obviously also takes place in the case of valid verification only when the safety system evaluates resetting to the desired state as safe or the desired state is permitted by the safety system. In specific forms of embodiment it can be advantageous for the verification of the resetting request by the safety system to be carried out only if the desired state is evaluated as safe. Otherwise, the safety system can, for example, trigger an alarm signal in response to the reset request.

By way of the verification in accordance with the invention it can be ensured that resetting cannot be triggered by faulty functioning of an elevator installation, erroneously by a user or intentionally by an unauthorized party. The control system can therefore also be part of an unsafe system of the elevator installation, i.e. a system which is subordinate to the safety system in hierarchical terms and should not, in particular, form part of the safety system. In the case of a mobile control unit carried by the user the connection with the safety system can, in accordance with the invention, even take place by way of a non-secure public network such as, for example, a mobile radio network.

Performance of the verification can comprise reading-out of a verification code which is transmitted directly with the reset request to the safety system. The verification code can in that case be input or produced by the trigger of the reset request before or at the time of transmission of the reset request. For verification of the reset request the safety system can compare the verification code with, for example, a target verification code stored in the safety system or generated by this. For example, the verification code can, on triggering or receipt of the reset request, be extracted in the manner of a cross-off list from a stored list. Systems of that kind can require, for example, manual selection from a printed list or be implemented electronically in chip cards, dongles or other mobile release devices, which are connectible with a control system, for example with an interface of a control unit.

Also conceivable are time-synchronized systems which generate at the trigger and in the safety system verification codes which are valid only in limited, synchronized time windows. However, verification codes can also comprise a simple personal identification number (PIN) or other static codes, which are known only to an authorized trigger. Equally conceivable would be, for example, a fingerprint or iris scan of a user, which is picked up for triggering the reset request and transmitted with the reset request in coded form. Further possibilities for verification in the case of transmission of the reset request are readily apparent to the expert.

Alternatively, performance of the verification takes place in the manner of a question/answer verification, in which a verification request is transmitted directly or indirectly to a system or a user (collectively termed "receiver" in the following), which or who has to confirm the request by a verification response. In particular, performance of the verification comprises transmission of a verification request, particularly an enquiry code, from the safety system to the control system in response to the received reset request, as well as reception in the safety system of a verification response, particularly response code, transmitted by the control system.

The verification request can be a simple signal of the safety system such as, for example, illumination of a button, which, for example, has to be pressed by a user as verification response for confirmation, of a keypad in the control system. However, for enhanced safety the verification request preferably comprises an enquiry code and/or the verification response comprises a response code. The enquiry code and/or the response code can have different degrees of complexity depending on the respective requirements and comprise, for example, an alphanumeric or a binary character sequence. Equally, the enquiry code and/or the response code can also comprise a pictorial representation such as, for example, symbols or a barcode or a double-matrix code. Enquiry code and response code can be identical, in which case, for example, the enquiry code, which is transmitted by the safety system, for the verification response is transmitted back by the receiver in identical form to the safety system. Enquiry code and response code are preferably provided in such a way that the correct response code can be transmitted to the safety system only with knowledge of the enquiry code.

As response codes use can also be made of, for example, verification responses independent of the verification request, such as, for example, authentication by a coded fingerprint or an iris scan of a user.

It will be obvious that the receiver of the verification request and the trigger can be different from one another, i.e. the verification request does not have to be directed to the trigger of the reset request. The reset request can, for example, be transmitted by a locally fixed control unit of the control system to the safety system (trigger), whereas the verification request is transmitted to a mobile control apparatus, which a service engineer carries, of the control system (receiver). Further variations are immediately evident.

Evaluation of the verification preferably comprises comparison of the verification response with a target verification response, and evaluation of the verification as valid when the verification response agrees with the target verification response. If the verification response comprises a response code, the target verification response preferably comprises a target response code.

The verification request is preferably regenerated, in particular randomly, by the safety system for each reset request. In this way verification requests for successive reset requests differ from one another. It is thereby possible to prevent a verification from being associated with a false reset request in the case of, for example, a short sequence of reset requests.

If the verification request, in particular—in a given case—the enquiry code, is generated randomly a conventional random generator can serve as a basis for the generation. Random generators of that kind can be implemented in the safety system in terms of hardware or software. In variants, the enquiry code can also be based on other factors such as, for example, the current date and clock time. Equally, the verification request and a target verification response for generation can be extracted in the form of a cross-off list from a list stored in the safety system. The verification request can in this case be an appropriate cross-off list with response code filed at the receiver. Cross-off lists of that kind can be updated by a firmware update at, for example, the time of maintenance.

In order to further increase the safety step the verification request is, with advantage, unique to each reset request. In this way it is ensured that the verification request is uniquely defined for each reset request.

For preference, exactly one target verification response is then associated with each verification request. In this case a uniquely defined combination of verification request and verification response or target verification response can be used for each reset request. It is thus ensured that previously employed verification requests or verification responses or, in a given case, corresponding enquiry codes or response codes cannot be present in the system, which could lead to erroneous or intentionally invalid verifications.

In variants it is obviously conceivable for, for example, always the same verification response to be employed and for a respective individual target verification response to be determined in dependence on other factors such as, for example, the current date and/or clock time.

Advantageously, the target verification response is generated by the safety system in accordance with a rule, particularly a coding, from the verification request. In this instance, the receiver transmitting the response code to the safety system has to use the same rule so as to generate the correct verification response, i.e. the verification response corresponding with the target verification response. The rule can comprise a simple set of rules which, for example, can be employed directly by a user. However, the rule can also comprise a complex coding which is, for example, implemented electronically.

Depending on the respective use it can be advantageous to generate the target verification response in the safety system from the verification request only after receipt of the verification response. This has the advantage that in the time period between transmission of the reset request and the verification response no target verification response, which could be read out and/or misdirected, is present in the safety system. Alternatively, the target verification response can be generated together with the verification request and filed in a memory of the safety system at least until transmission of the verification response.

The control system preferably comprises at least one of the following control units:
- a locally fixed control unit, particularly an operating unit or a control unit of an elevator control,
- a mobile control unit which is connected or connectible with the safety system by way of the control system, wherein the control system preferably comprises a connection with an internal or external wire-free network by way of which the mobile control unit is connected or connectible.

In that case, advantageously
- the verification request is transmitted from the safety system to the at least one control unit and
- the verification response is transmitted from the at least one control unit or from a further control unit of the control system to the safety system.

The locally fixed control unit can be an internal system of the elevator installation and a part of an elevator control such as, for example, a control unit. However, the locally fixed control unit can also comprise parts of an external system or be provided by an external system. For example, a maintenance system or maintenance center of the installation operator for, for example, several elevator installations is conceivable. If external systems are embraced, the at least one communications interface and/or the control system can comprise an interface for connection with an external network such as, for example, the Internet or a mobile radio network. Here, "locally fixed" designates both a stationary, i.e. non-moved, arrangement and a fixed arrangement at moved components of the elevator installation such as can be the case, for example, with an operating panel in an elevator car.

The locally fixed control unit can comprise means for automatically generating the verification response in response to transmission of a verification request and for transmitting it to the safety system. This can be advantageous with, for example, control units of the elevator control in order to be able to independently verify the reset request. The locally fixed control units can also comprise means for data exchange with a user and/or for connection of a release device (see below). The locally fixed control unit can comprise, for example, an operating unit arranged in an elevator car. The operating unit can, for example, be arranged as a maintenance unit behind a wall panel or a maintenance window. However, the operating unit can also comprise a freely accessible operating panel in the elevator car. In that case, for example, use can be made of a display, which is present in any case, for representation of the verification request, whilst buttons, which are present in any case, can serve for manual input of the verification response. In this way synergetic use can be made of components of the elevator installation which are present anyway.

The mobile control unit can, for example, be carried by a user and is constructed for connection with the safety system by way of the control system or by way of the at least one communications interface. For that purpose, the control system and/or the communications interface can comprise, for example, a connection to a wire-free internal network such as, for example, a WLAN network or an external network such as, for example, a mobile radio network. However, the mobile control unit can also be connected or connectible with the control system by way of a plug connection at an appropriately constructed interface (for example, by way of a further, locally fixed control unit). The mobile control unit can comprise means for data exchange with a user or for connection of a release device (see below). The mobile control unit can be, for example, diagnostic or maintenance apparatus of the elevator installation, a mobile telephone or a tablet computer (so-called "tabs" or "pads").

The verification request is preferably transmitted from the safety system to the at least one control unit. The verification request can be read out thereat by, for example, a user or a release device connected with the at least one control unit. Transmission of the verification response to the safety system in that case does not necessarily have to take place from the same control unit insofar as the control system comprises more than one control unit. In particular, in this instance basically any combinations of the above-mentioned control units are conceivable in order to receive the verification request from the safety system by way of one of the control units and to transmit it to the safety system by way of a further control unit.

Advantageously, the at least one control unit comprises at least means for reading out the verification request and the control unit, from which the verification response is transmitted to the safety system, comprises at least means for input of the verification response. The verification request is in that case read out by way of the means for reading out and the verification response is input by way of the means for inputting. It will be obvious that in the case of only one control unit this can comprise not only the means for reading out, but also the means for inputting.

The means for reading-out of the verification request can then comprise a display for visual representation of the verification request, on which display, for example, the enquiry code can be indicated. The means for inputting can comprise a keypad, by way of which, for example, the response code can be manually input. In this case, the verification request can be read out by a user who generates the verification response and can be input by the user. It will be obvious that the verification response can in that case be generated by the user by way of, for example, an independent external apparatus through input of the verification request. The verification response can then be transferred manually from the external apparatus to the control unit from which the verification response is transmitted to the safety system.

However, the means for reading out can also comprise an interface by way of which the verification code can be read out by a release device connectible or connected with the interface. In this case, the interface can also provide the means for input of the verification response, which, for example, is automatically generated by the connected release device and transmitted to the safety system. For that purpose the release device comprises means for generating the verification response from the verification request, which can, for example, be implemented in terms of hardware or software in a circuit or a programmable computer unit. Release devices of that kind can comprise, for example, chipcards, dongles, USB sticks or other mobile devices, which can be connected with the interface.

Depending on the respective kind of control unit the at least one control unit can itself comprise means for generating a verification response from the verification request. These means can comprise, for example, a circuit in which, for example, a rule for generation of the verification response or a list of verification responses can be implemented in terms of hardware or software. For preference, in this case the verification response is automatically generated by the at least one control unit on receipt of the verification request and transmitted to the safety system. This is particularly advantageous if the control unit is a controlling unit which can verify the reset request without interaction with a user. The means for generating the verification response can, however, also advantageously be present in other locally fixed or mobile control units.

For safety it can additionally be provided that the transmission of the verification response has to be triggered by the user and the transmission can be triggered only by, for example, a key switch or an additional code enquiry. Equally, it is conceivable for the verification response to be produced from the verification request only as a result of an appropriate input.

Performance of the verification preferably has to take place within a predetermined time period in order to be evaluated by the safety system as valid. The time period can then be triggered by the reset request or only with the transmission of the verification request by the safety system. If the predetermined time period elapses without verification being concluded a new reset request is, as a rule, required. In this way the safety system is prevented from being in an undefined waiting state for a longer period of time.

The invention also relates to an elevator installation, particularly for carrying out a method according to the invention, comprising a safety system, which is resettable from an actual state, in particular from a state in which a normal operation of the elevator installation is not released, to a desired state, in particular a normal state in which a normal operation of the elevator installation is released by the safety system. In that case the safety system is connected by way of at least one communications interface for data exchange to a control system, which is associated with the elevator installation, but which, in particular, does not belong to the safety system. The elevator installation is distinguished by the fact that the safety system comprises means for receiving a reset request, which is transmitted from the control system, for resetting from the actual state to the desired state and means for carrying out verification of the reset request by way of the control system as well as means for evaluating validity of the verification. The safety system is in that case constructed in such a manner that it resets from the actual state to the desired state as a consequence of a verification evaluated as valid.

It is readily apparent that the construction of the elevator installation in accordance with the invention can be provided by, for example, appropriate programming of programmable control units of the safety system as well as the control system or the components thereof. In that case use can be made of components of the elevator installation which are present in any case, such as, for example, an operating panel in an elevator car, which is connected with the safety system by way of a conventional communications bus such as, for example, a CAN bus.

In that case, the means for carrying out the verification preferably comprise transfer means for transmission of a verification request to the control system and receiving means for receiving a verification response from the control system.

With advantage, the safety system comprises means for generation, in particular for random generation, of a verification request, particularly an enquiry code, and means for generation of a target verification response associated with the verification request, particularly a target response code associated with the enquiry code according to a rule or a list. In that case the means for evaluating validity of the verification are preferably constructed for the purpose of comparing a verification response, which is received from the control system, with the target verification response.

The control system associated with the elevator installation preferably comprises at least one, preferably several, of the following control units:
- a locally fixed control unit, particularly an operating unit arranged in an elevator car or a control unit of an elevator control,
- a mobile control unit, which is connected or connectible with the safety system by way of the control system, wherein the control system preferably comprises an internal wireless network or an interface for connection with an external wireless network by way of which the mobile control unit is connected or connectible.

Internal control units are part of an elevator installation, whereas external components of the control system are indeed associated with the elevator installation, but are not comprised therein.

The at least one control unit preferably comprises:
- means for reading out the verification request, particularly an interface for connection of a further control unit or a mobile release device for reading out the verification response, or a display for visual representation of the verification request, and/or
- means for input of the verification response, particularly an interface for connection of a further control unit or a mobile release device for input of the verification response or a keypad for manual input of the verification response, and/or
- means for generating the verification response, particularly a circuit or a programmable computer unit.

Possible further required components or synergetic utilizations of already present components of an elevator installation according to the invention are readily apparent from the above description of the method according to the invention.

In addition, further advantageous forms of embodiment and feature combinations of the invention are evident from the following detailed description and the totality of the patent claims.

DESCRIPTION OF THE DRAWINGS

The drawings used for explanation of the embodiments schematically show.

Basically, the same parts are provided in the figures with the same reference numerals.

DETAILED DESCRIPTION

Figure 1:
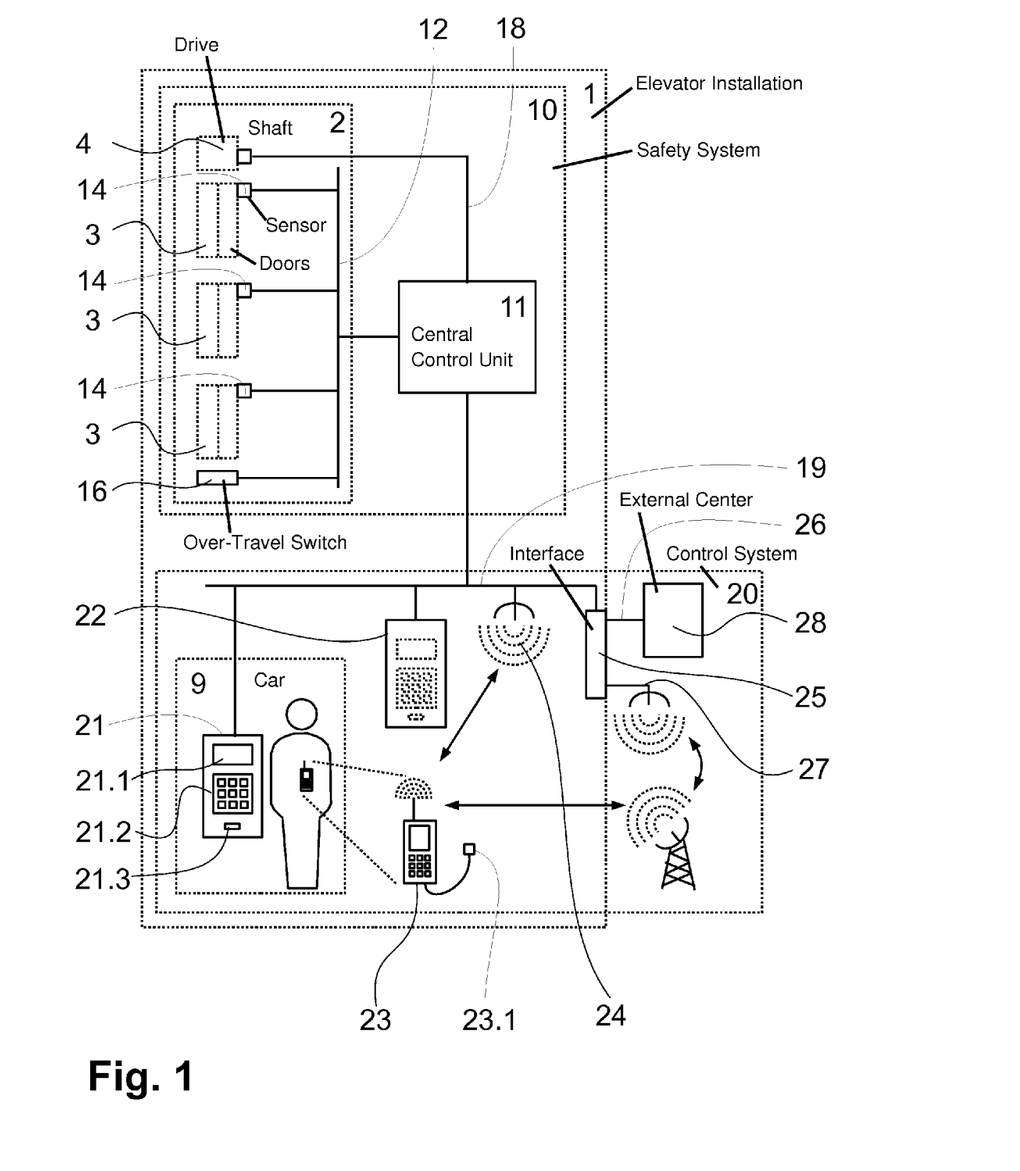
FIG. 1 is a schematic diagram of a safety system and a control system of an elevator installation according to the invention.

FIG. 1 shows (indicated in dashed lines) an elevator shaft 2 of an elevator installation 1. The elevator installation 1 comprises a safety system 10 with a central control unit 11 and a safety bus 12. The control unit 11 can be constructed as a programmable computer unit or comprise a computer unit of that kind, whereby the functionality required for carrying out the method according to the invention (see FIGS. 2 and 3) can be provided by, for example, appropriate programming. The safety bus 12 can be implemented as, for example, a controller area network (CAN) bus. Different safety elements of the safety system 10 for monitoring the elevator installation 1 are connected with the safety bus 12 by way of bus junctions (not illustrated). In the present case, door sensors 14 for monitoring shaft doors 3 in the elevator shaft as well as an over-travel switch 16 are illustrated. It will be obvious that these safety elements have been selected purely by way of example and that in practice a plurality of further safety elements can be connected with the safety system 10.

As an alternative to the safety bus 12 the safety elements such as door sensors 14, over-travel switch 16 or further safety elements can be connected in series in a safety circuit. Here the safety circuit is connected with the control unit 11. In the case of such a solution the safety elements are usually not individually monitored. The safety circuit indicates merely the state of all safety elements. If one safety element adopts an unsafe state, for example in the case of an open shaft door 3, the safety circuit is interrupted and indicates an unsafe state of the elevator installation 1.

The control unit 11 is connected with, for example, a drive 4 or a brake unit of the elevator installation 1 in order to interrupt travel operation. This can be the case if, for example, the safety system 10 passes to an emergency state as a consequence of a faulty function report of the safety elements or an interruption of the safety circuit. In the present instance the control unit 11 is connected with the drive 4 by way of a separate line 18. The connection can, however, also be provided by way of the safety bus 12.

The control unit 11 is connected by way of a communications interface 19 with a control system 20, which is associated with the elevator installation 1. The communications interface 19 can, analogously to the safety bus 12, be implemented as a CAN bus. The control system 20 comprises parts of the elevator installation 1, but can also comprise external components which are not to be ascribed to the elevator installation 1. The control system 20 comprises various control units 21, 22, 23, 28 which are connected directly or indirectly with the control unit 11 and thus with the safety system 10 by way of the communications interface 19.

One of the control units is constructed as an operating unit 21 (indicated in dashed lines) fixedly arranged in an elevator car 9. The operating unit 21 comprises a display 21.1 as well as a keypad 21.2 or, for example, a touchscreen for the reading-out or input of data by a user. The operating unit 21 can also comprise an interface 21.3 with which a portable device such as, for example, a dongle or a portable computer is connectible. The interface 21.3 can in that case be constructed for the input of data and/or reading-out of data from a connected device. In particular, the interface 21.3 can also be constructed as a card reader for a chipcard.

A further one of the illustrated control units is constructed as control unit 22 of an elevator control. This can be arranged at various locations in the elevator installation 1 such as, for example, in the elevator shaft 2, in a maintenance area or also, for example, behind a wall panel in the elevator car 9. The control unit 22 forms a controlling unit which is basically provided for automatic, i.e. carried out by the control unit 22 itself, verification in accordance with the invention. For that purpose the control unit can comprise an appropriate circuit which is provided or appropriately programmed for the verification. However, this does not exclude the possibility of the control unit 22 similarly comprising means for reading out and/or means for inputting as well as an interface (indicated in dashed lines).

A further one of the illustrated control units is constructed as a mobile control unit 23. This can be, for example, a portable computer, special maintenance apparatus or a mobile telephone. The mobile control unit 23 can be carried by a user. The control system 20 can comprise an internal wireless network 24 connected with the communications interface 19 and, by way of this, with the safety system 10. The mobile control unit 23 is, in the case of appropriate construction with wireless communication means, connected or connectible with the safety system 10 by way of the wireless network 24. The mobile control unit 23 can, however, alternatively or additionally also comprise a terminal 23.1 by which it is connected or connectible with the communications interface 19 via the interface 213 or via an appropriate interface in the control system 20.

The control system 20 can additionally comprise an interface 25 for an external network. By way of the interface 25 the control system can be connected with, for example, a cable-supported external network 26 such as the Internet. The interface 25 can also provide a connection to an external wireless network such as, for example, a mobile radio network 27. It will be obvious that the external network can also be special networks which are provided by the installation operator for, for example, remote maintenance of the elevator installation 1. For example, an external maintenance center 28 can be connected with the interface 25 by way of the cable-supported external network 26. In this case the maintenance center 28 (as well as the external network) forms a component of the control system 20, which does not belong to the elevator installation 1, thus is an external component.

The external wireless network 27 can be used for connection of the mobile control unit 23. By way of example, if the mobile control unit 23 is, for example, a mobile telephone this can be connected with the interface 25 by way of the mobile radio network 27. The mobile radio network 27 and the mobile telephone 23 in this case form external components of the control system 20.

Figure 2:
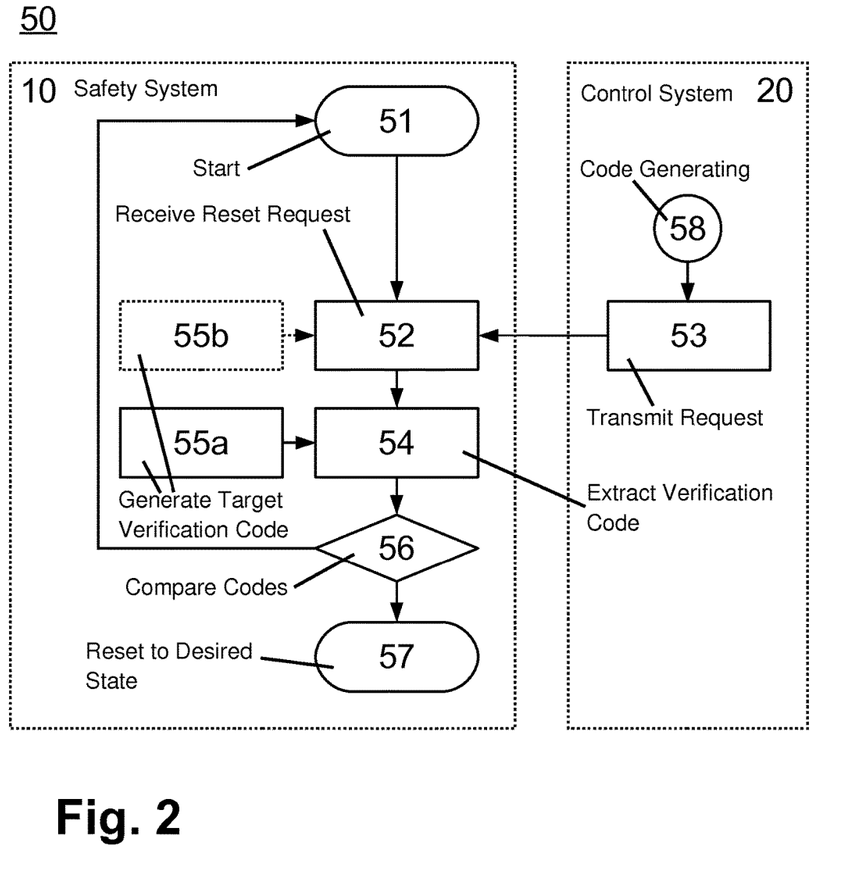
FIG. 2 is a flow chart of a method according to the invention, in which a verification code with a reset request is received from the safety system.

FIG. 2 shows a flow chart 50 for carrying out a first variant of the method according to the invention in the safety system 10 as well as in the control system 20. At the start point 51 the safety system 10 is in an actual state. In a first step 52 the safety system 10 receives a reset request, which is transmitted to the safety system 10 by way of or from an internal or external control unit 21, 22, 23, 28 of the control system 20 in a request step 53. The reset request is in that case composed of a first data sub-set, by which the reset request from the safety system 10 is identifiable as such. A verification code can be included in a further data sub-set, which code is, for example, newly generated for each reset request in a generating step 58 by a system or a user. It will be obvious that the verification code, depending on the respective safety requirement, has to be suitable for enabling reliable verification of the reset request. For this purpose the verification code can, for example, be extracted from a predetermined list (cross-off list) or be generated by an independent device in a time-synchronous time window with a target verification code in the safety system 10. The verification code can also include an authentication of the system or the user.

In a first verification step 54 the verification code is extracted by the safety system 10 from the reset request. In a second verification step 56 the extracted verification code is compared with a target verification code. The target verification code can in that case be generated in a generation step 55a during performance of the first verification step 54 by the safety system 10. Alternatively, the target verification step can already be generated during the step 52 on receipt of the reset request (step 55b). The generation of the target verification code can then be carried out analogously to generation of the verification code.

If it is established in the second verification step 56 that the extracted verification code agrees with the target verification code the verification is evaluated as valid. The safety system 10 consequently resets, insofar as the desired state is evaluated as safe, to the desired state (step 57). If verification code and target verification code do not agree, the reset request is verified as non-valid. The safety system 10 consequently remains in the actual state 51. An alarm can optionally be triggered in the case of an invalid verification, which alarm indicates the non-verified reset request and thus potential faulty functioning or faulty processing with the reset request.

Figure 3:
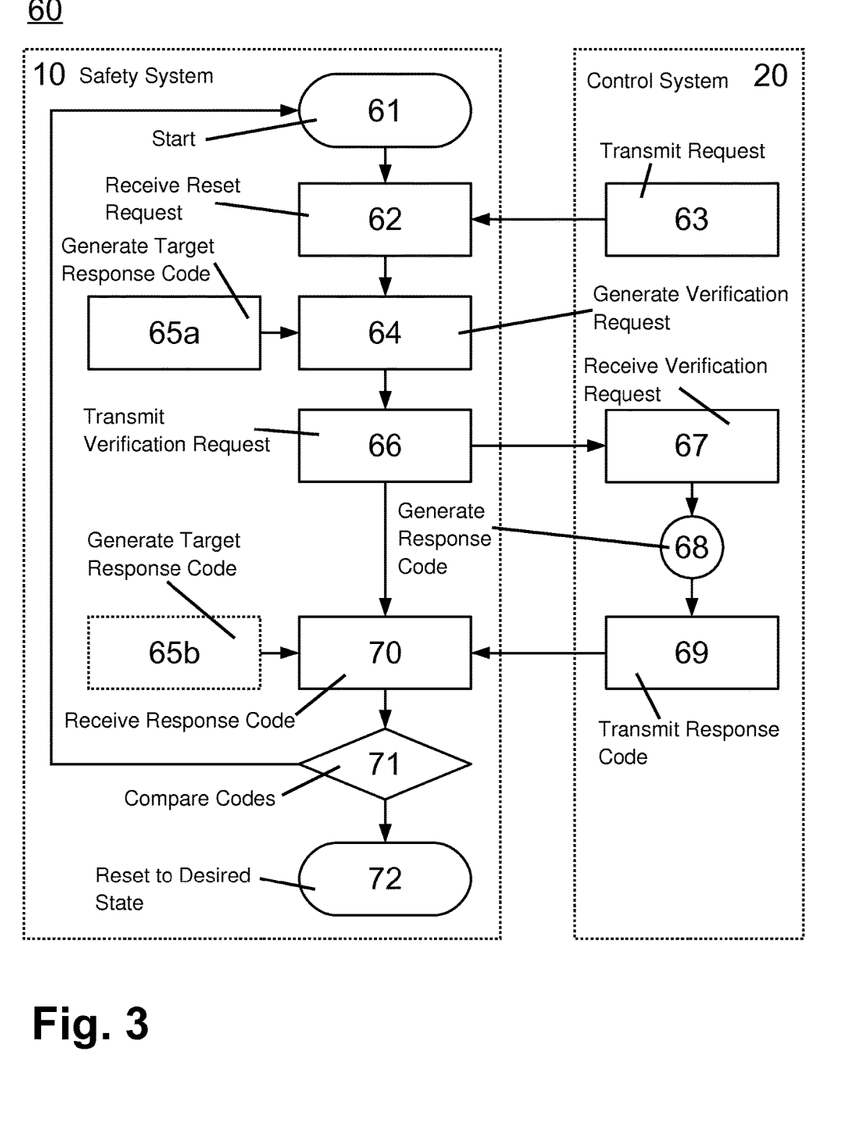
FIG. 3 is a flow chart of a method according to the invention, in which in response to a verification request a verification response is received from the safety system.

FIG. 3 shows a further flow chart 60 for carrying out a second variant of the method according to the invention in the safety system 10 as well as in the control system 20. At the start point 61 the safety system 10 is in an actual state. In a first step 62 the safety system 10 receives a reset request, which is transmitted to the safety system 10 by way of or from an internal or external control unit 21, 22, 23, 28 of the control system 20 in an interrogation step 63. The reset request can in this case comprise only a single data set, which the reset request alone identifies as such. Obviously, additional data can also be transferred such as, for example, an identification of the control unit from which the reset request was transmitted.

In response to receipt 62 of the reset request from the control system 20 the safety system 10 generates the verification request, for example an enquiry code, in a generation step 64. Simultaneously with the generation step, a further generation step 65a can be performed, by which a target response code, which belongs to the enquiry code, is generated as target verification response and stored in the safety system. Enquiry code and target response code can in that case be uniquely associated with one another. After generation 64 of the enquiry code this is transmitted in a transmission step 66 from the safety system 10 to the control system 20 and received therein (step 67). The enquiry code can then be selectively transmitted to a specific control unit 21, 22, 23, 28 of the control system 20. This does not have to be identical with a control unit 21, 22, 23, 28 from which the reset request was transmitted to the safety system 10.

In response to receipt 67 of the enquiry code a response code as a verification response is generated in the control system 20 (step 68). This can be carried out automatically by a circuit or an appropriately programmed computer unit of the corresponding control unit 21, 22, 23, 28. Alternatively, for that purpose, for example, an independent release device (not illustrated) can be connected by a user to the corresponding control unit by way of, for example, the interface 21.3. In a further variant the enquiry code is, for example, visually represented at the control unit 21, 22, 23, 28, insofar as this is appropriately constructed. The enquiry code can in this case be read out by a user in order to generate the response code (step 68). For that purpose the user can employ a rule for generation of the response code, which the user knows, or for example use an independent device which, on input of the enquiry code, is constructed for generation of the response code.

The response code is transmitted from the control system 20 to the safety system in a transmission step 69. The control unit 21, 22, 23, 28 used in that case does not need to be identical with the control unit 21, 22, 23, 28 from which the reset request was transmitted and also not with the control unit 21, 22, 23, 28 to which the enquiry code was transmitted.

The response code can be received in the safety system 10 in a receiving step 70. As an alternative to the generation step 65*a* the target response code can be generated only in a generation step 65*b* on receipt 70 of the response code.

The received response code is compared in a comparison step 71 with the target response code. If it is established in the comparison step 71 that the response code agrees with the target response code the verification is evaluated as valid. The safety system 10 as a consequence resets, insofar as the desired state is evaluated as safe, to the desired state (step 72). Otherwise, the reset request is verified as non-valid. The safety system 10 consequently remains in the actual state 61.

Further advantageous variants for performance of verification of the method according to the invention are readily evident to the expert.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method of resetting a safety system of an elevator installation from an actual state, in which a normal operation of the elevator installation is not released, to a desired state, in which a normal operation of the elevator installation is released by the safety system, wherein the safety system is connected by a communications interface for data exchange with a control system associated with the elevator installation, but which control system is not included in the safety system, comprising the steps of:
    a) receiving a reset request, which is transmitted from the control system, for resetting from the actual state to the desired state, in the safety system;
    b) performing a verification of the reset request by the safety system, wherein performing the verification of the reset request by the safety system includes transmitting a verification request as an enquiry code from the safety system to the control system in response to the received reset request and receiving in the safety system a verification response as a response code transmitted from the control system;
    c) evaluating the verification by the safety system, wherein the evaluating the verification by the safety system includes comparing the verification response with a target verification response, whereby if the verification response is a response code, the target verification response is a target response code, and evaluating the verification as valid if the verification response agrees with the target verification response; and
    d) resetting the safety system from the actual state to the desired state if the verification by the safety system is evaluated as valid.

2. The method according to claim 1, wherein only one target verification response is assigned to the verification request.

3. The method according to claim 1, wherein the target verification response is generated by the safety system in accordance with a coding rule from the verification request, and wherein the target verification response is generated from the verification request only after receipt of the verification response.

4. A method of resetting a safety system of an elevator installation from an actual state, in which a normal operation of the elevator installation is not released, to a desired state, in which a normal operation of the elevator installation is released by the safety system, wherein the safety system is connected by a communications interface for data exchange with a control system associated with the elevator installation, but which control system is not included in the safety system, comprising the steps of:
    a) receiving a reset request, which is transmitted from the control system, for resetting from the actual state to the desired state, in the safety system;
    b) performing a verification of the reset request by the safety system, wherein performing the verification of the reset request by the safety system includes transmitting a verification request as an enquiry code from the safety system to the control system in response to the received reset request, receiving in the safety system a verification response as a response code transmitted from the control system, and regenerating the verification request by the safety system for each reset request;
    c) evaluating the verification by the safety system; and
    d) resetting the safety system from the actual state to the desired state if the verification by the safety system is evaluated as valid.

5. The method according to claim 4 including regenerating the verification request randomly wherein the verification response is unique to each reset request.

6. A method of resetting a safety system of an elevator installation from an actual state, in which a normal operation of the elevator installation is not released, to a desired state, in which a normal operation of the elevator installation is released by the safety system, wherein the safety system is connected by a communications interface for data exchange with a control system associated with the elevator installation, but which control system is not included in the safety system, wherein the control system includes at least one of the following control units: a locally fixed control unit arranged in an elevator car, a control unit of an elevator control; and a mobile control unit connected with the safety system by the control system, wherein the control system includes a connection with an internal wire-free network or external wire-free network by which the mobile control unit is connected, wherein the method comprises the steps of:
    a) receiving a reset request, which is transmitted from the control system, for resetting from the actual state to the desired state, in the safety system;
    b) performing a verification of the reset request by the safety system, wherein performing the verification of the reset request by the safety system includes transmitting a verification request as an enquiry code from the safety system to the control system in response to the received reset request, receiving in the safety system a verification response as a response code transmitted from the control system, the verification request transmitted from the safety system to the at least one control unit and the verification response transmitted from the at least one control unit or from a further control unit of the control system to the safety system, and reading out the verification request from the at least one control unit using a display or a portable device, and the at least one control unit, from which the verification response is transmitted to the safety system, includes an input of the verification response;

c) evaluating the verification by the safety system; and d) resetting the safety system from the actual state to the desired state if the verification by the safety system is evaluated as valid.

7. A method of resetting a safety system of an elevator installation from an actual state, in which a normal operation of the elevator installation is not released, to a desired state, in which a normal operation of the elevator installation is released by the safety system, wherein the safety system is connected by a communications interface for data exchange with a control system associated with the elevator installation, but which control system is not included in the safety system, wherein the control system includes at least one of the following control units: a locally fixed control unit arranged in an elevator car; a control unit of an elevator control; and a mobile control unit connected with the safety system by the control system, wherein the control system includes a connection with an internal wire-free network or external wire-free network by which the mobile control unit is connected, wherein the method comprises the steps of:

a) receiving a reset request, which is transmitted from the control system, for resetting from the actual state to the desired state, in the safety system;

b) performing a verification of the reset request by the safety system, wherein performing the verification of the reset request by the safety system includes transmitting a verification request as an enquiry code from the safety system to the control system in response to the received reset request, receiving in the safety system a verification response as a response code transmitted from the control system, the verification request transmitted from the safety system to the at least one control unit and the verification response transmitted from the at least one control unit or from a further control unit of the control system to the safety system, and the at least one control unit generating a verification response from the verification request, the verification response being automatically generated by the at least one control unit on receipt of the verification request and transmitted to the safety system;

c) evaluating the verification by the safety system; and d) resetting the safety system from the actual state to the desired state if the verification by the safety system is evaluated as valid.

8. A method of resetting a safety system of an elevator installation from an actual state, in which a normal operation of the elevator installation is not released, to a desired state, in which a normal operation of the elevator installation is released by the safety system, wherein the safety system is connected by a communications interface for data exchange with a control system associated with the elevator installation, but which control system is not included in the safety system, comprising the steps of:

a) receiving a reset request, which is transmitted from the control system, for resetting from the actual state to the desired state, in the safety system;

b) performing a verification of the reset request by the safety system;

c) evaluating the verification by the safety system, wherein performance of the verification must take place within a predetermined time period in order to be evaluated as valid; and d) resetting the safety system from the actual state to the desired state if the verification by the safety system is evaluated as valid.

9. An elevator installation comprising:

a safety system which is resettable from an actual state, in which a normal operation of the elevator installation is not released, to a desired state, in which a normal operation of the elevator installation is released by the safety system; and a communications interface connected to the safety system for data exchange with a control system which is associated with the elevator installation, but which is not included in the safety system, wherein the safety system includes a central control unit that:

a) receives a reset request, transmitted from the control system through the communications interface, for resetting from the actual state to the desired state, b) performs a verification of the reset request, c) evaluates validity of the verification, and d) responds to the verification evaluated as valid by resetting from the actual state to the desired state;

wherein the central control unit of the safety system generates randomly a verification request as an enquiry code, generates a target verification response associated with the verification request as a target response code associated with the enquiry code, and for evaluation of validity of the verification compares a verification response received from the control system with the target verification response.

10. The elevator installation according to claim 9, wherein the central control unit transmits a verification request to the control system and receives a verification response from the control system.

11. The elevator installation according to claim 9, wherein the control system associated with the elevator installation includes at least one control unit being one of:

a locally fixed control unit arranged in an elevator car, a control unit of an elevator control, and a mobile control unit connected with the safety system by the control system, wherein the control system includes an internal wire-free network or an interface for connection with an external wire-free network by which the mobile control unit is connected.

12. The elevator installation according to claim 11, wherein the at least one control unit includes:

a) an interface for reading out the verification request through a connection with at least one of a further control unit, a mobile control unit for reading out the verification response, and a display for visual representation of the verification request;

b) an input device for input of the verification response, the input device being at least one of an interface for connection of a further control unit, a mobile release device for input of the verification response, and a keypad for manual input of the verification response; and c) a circuit or a programmable computer unit for generating the verification response.

\* \* \* \* \*